(12) United States Patent
Lin

(10) Patent No.: US 9,042,138 B2
(45) Date of Patent: *May 26, 2015

(54) POWER MANAGEMENT DEVICE OF A TOUCHABLE CONTROL SYSTEM

(71) Applicant: EGALAX_EMPIA TECHNOLOGY INC., Taipei (TW)

(72) Inventor: Po-Chuan Lin, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 71 days.

This patent is subject to a terminal disclaimer.

(21) Appl. No.: 13/732,821

(22) Filed: Jan. 2, 2013

(65) Prior Publication Data

US 2014/0104904 A1 Apr. 17, 2014

(30) Foreign Application Priority Data

Oct. 11, 2012 (TW) .............................. 101137551 A

(51) Int. Cl.
*H02M 3/18* (2006.01)
*H02M 7/00* (2006.01)
*G05F 1/10* (2006.01)
*G05F 3/02* (2006.01)
*H02M 3/07* (2006.01)

(52) U.S. Cl.
CPC ................. *H02M 3/07* (2013.01); *H02M 3/073* (2013.01)

(58) Field of Classification Search
CPC ................................ H02M 3/073; H02M 3/07
USPC .............................................. 363/60; 327/536
See application file for complete search history.

(56) References Cited

U.S. PATENT DOCUMENTS

| | | | | |
|---|---|---|---|---|
| 6,791,212 | B2 * | 9/2004 | Pulvirenti et al. | 327/536 |
| 7,928,796 | B2 * | 4/2011 | Namekawa | 363/60 |
| 8,749,301 | B2 * | 6/2014 | Lin | 327/536 |
| 2007/0090871 | A1 * | 4/2007 | Kwak et al. | 327/536 |
| 2012/0127122 | A1 * | 5/2012 | Lim | 345/174 |
| 2014/0103982 | A1 * | 4/2014 | Lin | 327/180 |

* cited by examiner

*Primary Examiner* — Jue Zhang
(74) *Attorney, Agent, or Firm* — Huffman Law Group, PC

(57) ABSTRACT

A power management device of a touchable control system includes a boost circuit, a storage circuit, a detection circuit and a loading circuit. The boost circuit has an output terminal and generates an output voltage. The storage circuit electrically connects to the output terminal of the boost circuit and stores the output voltage. The detection circuit electrically connects to the storage circuit so as to detect the output voltage. The loading circuit electrically connects or disconnects to the output terminal of the boost circuit according to a predetermined value of the output voltage.

11 Claims, 6 Drawing Sheets

POWER MANAGEMENT DEVICE OF A TOUCHABLE CONTROL SYSTEM

BACKGROUND OF THE INVENTION

1. Field of the Invention

The present invention generally relates to a touchable control system, and more particularly to a power management device of a touchable control system for rapidly replying to a sleep mode.

2. Description of Related Art

A touch panel may be combined with a display screen to result in a touch screen. Touch screens have been widely used as input interfaces for electronic devices for detecting touch inputs within a display area. If no touch inputs input to the touch screen, users usually close the power supplied to the touch screen to enable the sleep mode for avoiding the unnecessary power consumption.

FIG. 1A shows a schematic circuit of a power management device 1 of a conventional touchable control system. As mentioned above, if the power of the touch screen is closed to enable the sleep mode, there are neither input signals of $V_{DD}$ and CK/CKB, nor output voltage $V_{out}$ and the loading circuit is disabled, wherein $V_{DD}$ is a logic high-level voltage (or the low voltage) of a pulse/inverted-pulse signal CK/CKB.

FIG. 1B shows an operating state of the power management device 1 of the conventional touchable control system. If the users need to use the touch panel to restore the sleep mode to the operating mode, the loading circuit has to reach the operating voltage $V_{DDH}$. In view of FIG. 1A, the loading circuit electrically connects to the output terminal 11t of the boost circuit 11 so as to consume the output current $I_O$. That is, the consumption adds the loading current $I_{Load}$. The output voltage $V_{out}$ usually utilities an external capacitor $C_{ext}$ to charge as the operating voltage of the loading circuit. In other words, if the touchable control system restores the sleep mode to the operating mode, the external capacitor $C_{ext}$ will start to charge. However, the output current $I_O$ do not fully flow to the external capacitor $C_{ext}$ but the loading circuit consumes a part of the output current Io, wherein the consuming output current $I_O$ is the loading current $I_{Load}$. Therefore, it takes much charge time to make the external capacitor $C_{ext}$ reach the operating voltage $V_{DDH}$ of the loading circuit, as shown in the curve 1.

As mentioned above, the loading circuit of the touchable control system needs to reach a predetermined operating voltage so as to restore the operating mode. However, the conventional designed touchable control system will charge the external capacitor to the operating voltage while receiving touch inputs. Although the charge time may be only few microseconds, which still make the users feel slow or delay with the conventional touchable control system.

A need has thus arisen to propose a novel power management device for rapidly replying to the sleep mode of the conventional touchable control system.

SUMMARY OF THE INVENTION

In view of the foregoing, an embodiment of the present invention provides a power management device of a touchable control system for providing a rapid response to the sleep mode of the touchable control system. Applying the power management device of a touchable control system of the present invention to a mobile phone, a computer or an electronic system having a touchable screen can make the electronic system rapidly restore the sleep mode to the operating mode. That is, the response time of restoring the sleep mode to the operating mode can significantly decrease such that the users can use the electronic system more conveniently and rapidly.

The power management device of a touchable control system includes a boost circuit, a storage circuit, a detection circuit and a loading circuit. The boost circuit has an output terminal and generates an output voltage. The storage circuit electrically connects to the output terminal of the boost circuit and stores the output voltage. The detection circuit electrically connects to the storage circuit so as to detect the output voltage. The loading circuit electrically connects or disconnects to the output terminal of the boost circuit according to a predetermined value of the output voltage.

DETAILED DESCRIPTION OF THE INVENTION

Figure 1A:
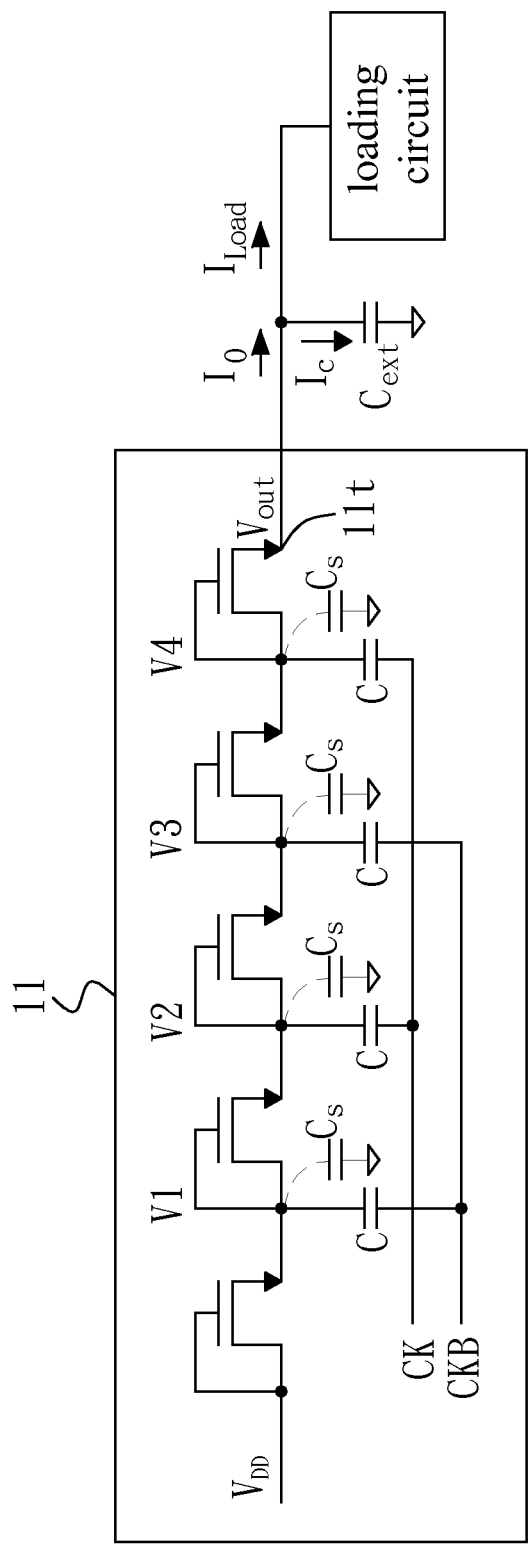
FIG. 1A shows a schematic circuit of a power management device of a conventional touchable control system.
Figure 1B:
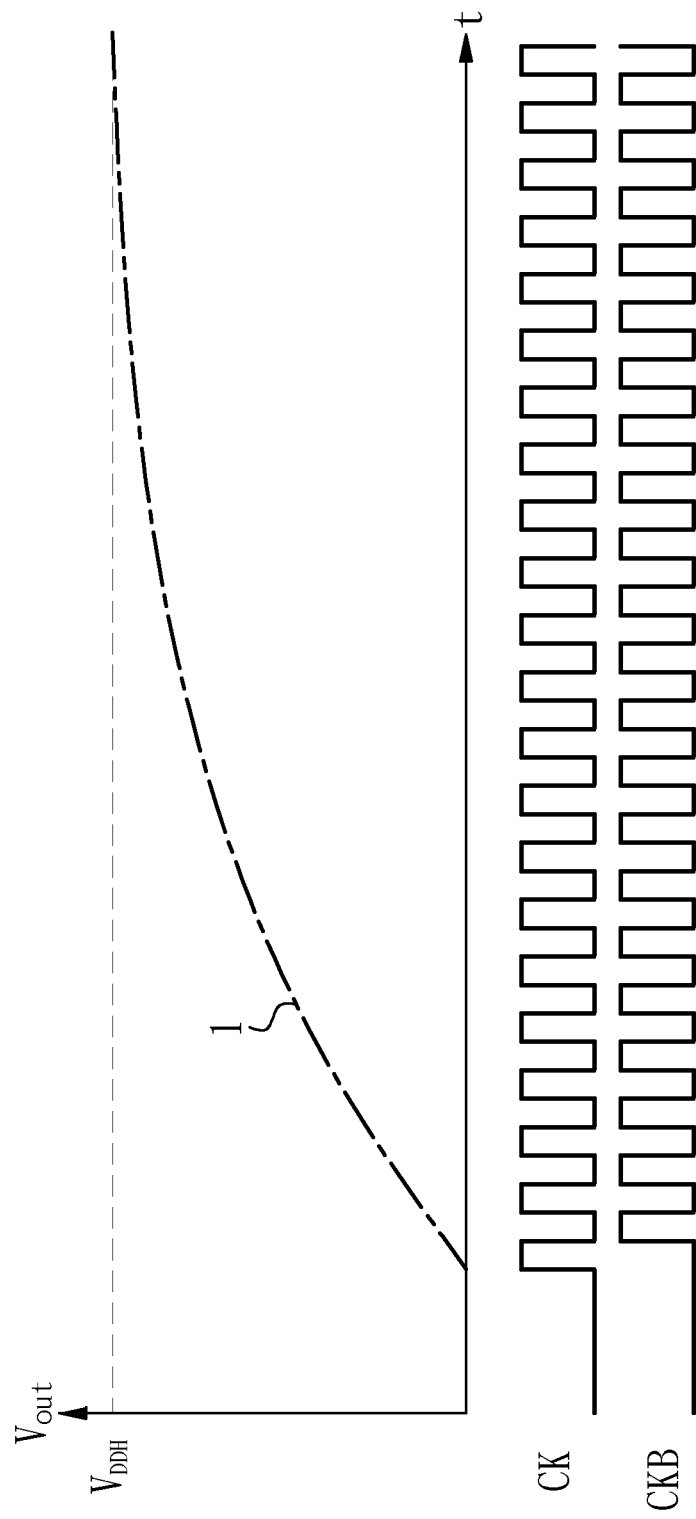
FIG. 1B shows an operating state of the power management device of the conventional touchable control system.
Figure 2A:
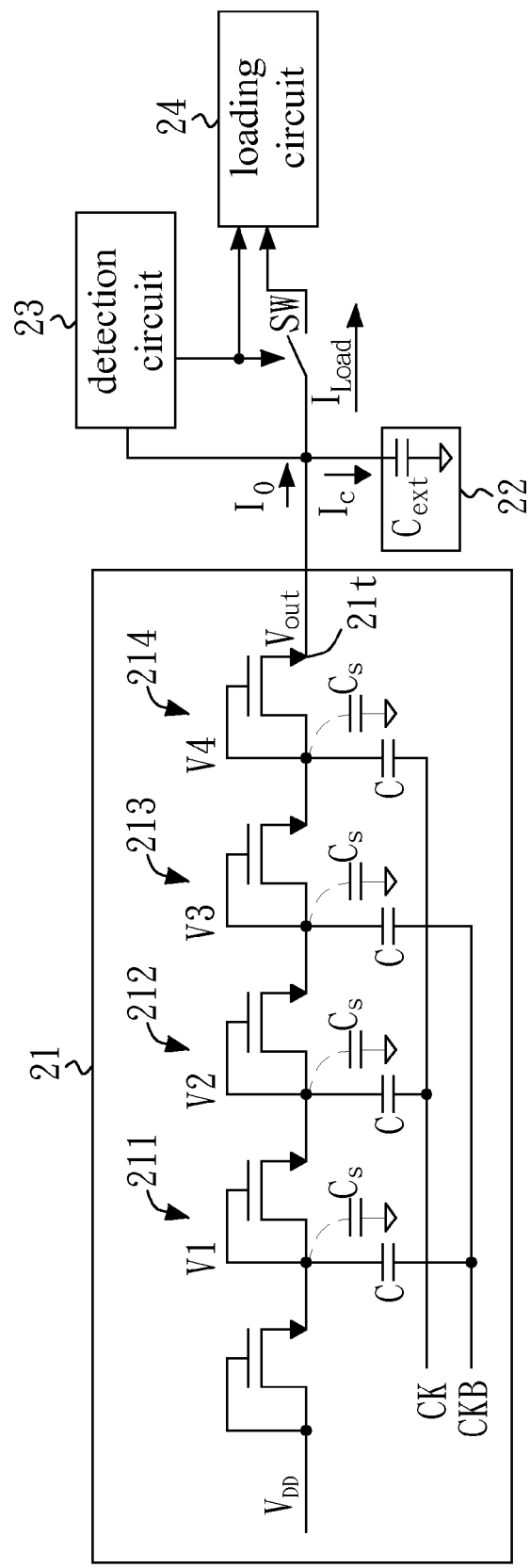
FIG. 2A shows the schematic circuit of the power management device of the touchable control system of the present invention.

FIG. 2A shows the schematic circuit of the power management device of the touchable control system of the present invention. The power management device includes a boost circuit 21, a storage circuit 22, a detection circuit 23 and a loading circuit 24. The boost circuit 21 has an output terminal 21t and generates an output voltage $V_{out}$ and an output current $I_o$. The storage circuit 22 electrically connects to the output terminal 21t of the boost circuit 21 and stores the output voltage $V_{out}$. The detection circuit 23 electrically connects to the storage circuit 22 so as to detect the output voltage $V_{out}$. The loading circuit 24 electrically connects or disconnects to the output terminal 21t of the boost circuit 21 according to a predetermined value of the output voltage $V_{out}$.

In an embodiment, the boost circuit 21 may be implemented to provide the output voltage $V_{out}$ by a variety of voltage converting circuits such as a voltage regulator or a charge pump. The charge pump comprises a Dickson charge pump, etc.

In an embodiment, the storage circuit 22 comprises an external capacitor $C_{ext}$ for storing the output voltage $V_{out}$. As mention in the prior art, the external capacitor $C_{ext}$ has to charge to reach the operating voltage $V_{DDH}$ to enable the loading circuit 24.

In an embodiment, the loading circuit 24 comprises a driving signal generating circuit adaptable to a touch panel (not shown) for providing a driving signal to the touch panel. The driving signal is induced by the touch panel to generate an induced signal, which is then processed by a signal processing technique to determine whether the touch panel is touched and to decide a touch point if touched.

In an embodiment, the detection circuit 23 comprises a comparator for comparing the output voltage $V_{out}$ across on the storage circuit 22 with a predetermined value $V_{ref}$. The predetermined value $V_{ref}$ comprises a reference voltage of the touchable control system, which is generated by a band gap circuit or a predetermined clock CK of the touchable control system.

Furthermore, in another embodiment, the device for detecting the variable current also can be implemented in the detection circuit 23 of the present invention. That is, if the current flowing through the storage circuit 23 reaches the predetermined value, the output terminal 21t of the boost circuit 21 will electrically connect to the loading circuit 24.

The power management device 2 further comprises a change-over switch SW, which electrically connects between the loading circuit 24 and the output terminal 21t of the boost circuit 21. While the output voltage $V_{out}$ detected by the detection circuit 23 reaches the predetermined value $V_{ref}$, the loading circuit 24 electrically connects to the output terminal 21t of the boost circuit 21 by the change-over switch SW. While the output voltage $V_{out}$ detected by the detection circuit 23 has not reach the predetermined value $V_{ref}$ yet, the change-over switch SW disconnects the loading circuit 24 with the output terminal 21t of the boost circuit 21 so as to the output current $I_O$ fully flows to the storage circuit 22. Therefore, the charge rate of the output voltage $V_{out}$ rapidly increases such that the touchable control system rapidly reaches the operating voltage $V_{DDH}$ to restore the sleep mode to the operating mode while receiving the touch inputs.

Figure 2B:
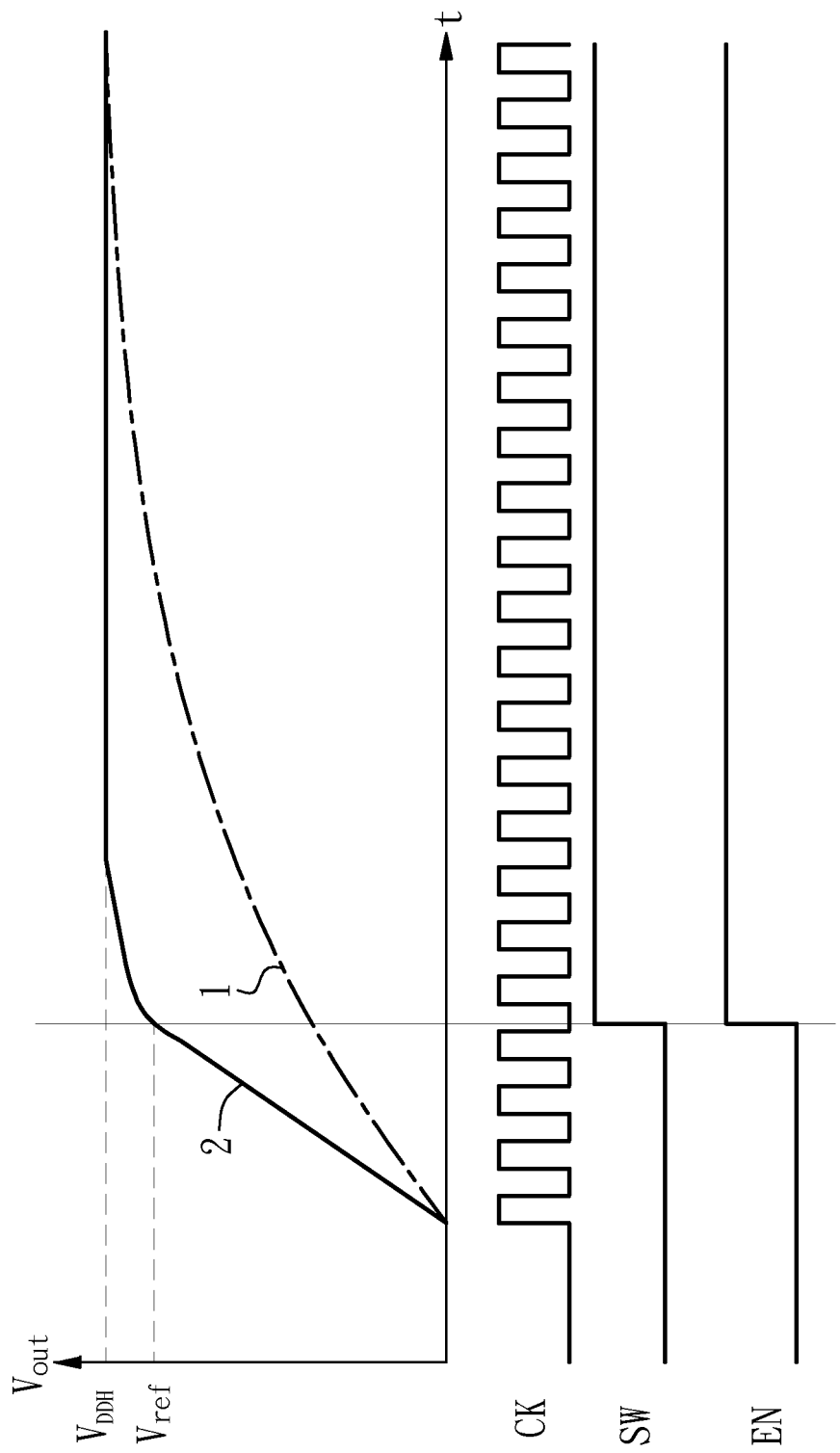
FIG. 2B shows the operating state of the power management device of the touchable control system of the present invention.

FIG. 2B shows the operating state of the power management device 2 of the touchable control system of the present invention. As mentioned above, the predetermined value $V_{ref}$ generates according to the predetermined clock CK of the touchable control system. Therefore, if the touchable control system reaches the predetermined clock CK, the change-over switch SW will enable the loading circuit 24. The output voltage $V_{out}$ across the external capacitor $C_{ext}$ as the curve 2 shown, compared to the curve 1 of the prior art, can rapidly reach to the operating voltage $V_{DDH}$.

Besides, it should be noted that the output voltage $V_{out}$ in the figures of the present invention charges from zero but which is simply clarified, not to limit the scope of the present invention. In other words, the power management device of the touchable control system of the present invention includes the detection circuit 23, which is carried out detecting the output voltage $V_{out}$. When the touchable control system restores the sleep mode to the operating mode and restores the operating mode to the sleep mode, the output voltage $V_{out}$ across the storage circuit 22 is not significantly decreased. That is, the output current $I_O$ fully flows to the storage circuit 22 by disconnecting the boost circuit 21 and the loading circuit 24 with the change-over switch SW so as to the touchable control system can rapidly restore the sleep mode to the operating mode next time.

The boost circuit 21 comprises a plurality of transistors 211, 212, 213, 214 and the transistor 214 electrically connects to the storage circuit 22. In another embodiment of the present invention, the predetermined value $V_{ref}$ can be set between a breakdown voltage $V_{breakdown}$ of the transistor 214 electrically connecting to the storage circuit 22 and the operating voltage $V_{DDH}$ of the touchable control system.

Moreover, the boost circuit 21 of the embedment may be implemented by a variety of voltage converting circuits. FIG. 2A shows a four-stage Dickson charge pump that may be adapted to implement the boost circuit 21 and may be described as follows:

$$V_{out} = V_{DD} + \Delta V - \sum_{k=1}^{4} V_{th} * V_k$$

$$\Delta V = V_{DD}[C/(C+Cs)] - Io/[f*(C+Cs)]$$

where $V_k$ is a node voltage of each stage circuit (k from 1 to 4), $\Delta V$ is a voltage difference of each stage circuit, $V_{DD}$ is a logic high-level voltage (or the low voltage) of a pulse/inverted-pulse signal CK/CKB, f is a frequency of the pulse/inverted-pulse signal CK/CKB, $V_{th}$ is a threshold voltage of a transistor, C is capacitance of each stage circuit, Cs is parasitic capacitance at each node, $I_O$ is an output current that is split into a current $I_C$ flowing through an external capacitance $C_{ext}$ and a load current $I_{Load}$.

As mentioned above, while the output voltage $V_{out}$ detected by the detection circuit 23 has not reach the predetermined value $V_{ref}$ yet, the change-over switch SW electrically disconnects the loading circuit 24 with the output terminal 21t of the boost circuit 21 so as to the output current $I_O$ fully flows to the storage circuit 22. Therefore, the output current $I_O$ does not decrease due to the extra consumption of the load current $I_{Load}$ since the load current $I_{Load}$ is zero. After that, the $\Delta V$ increases and the output voltage $V_{out}$ increases more rapidly. That is, the external capacitance $C_{ext}$ is charging. While the output voltage $V_{out}$ detected by the detection circuit 23 reaches the predetermined value $V_{ref}$, the change-over switch SW electrically connects the loading circuit 24 to the output terminal 21t of the boost circuit 21 so as to a part of the output current $I_O$ flows to the loading circuit 24, which is the load current $I_{Load}$.

Figure 3A:
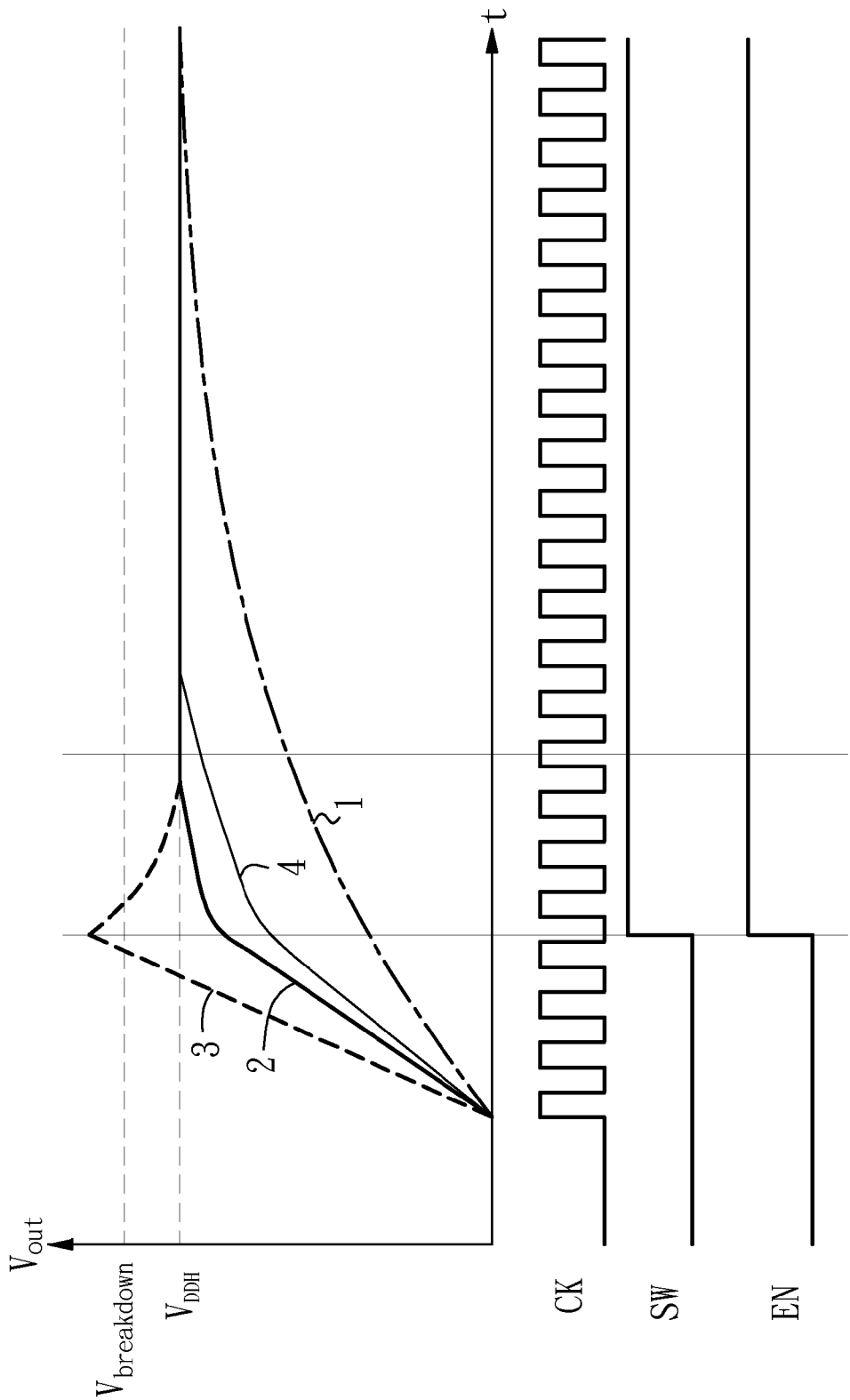
FIG. 3A shows the operating state of the power management device of the touchable control system of the present invention.

FIG. 3A shows the operating state of the power management device of the touchable control system of the present invention. As mentioned above, every capacitor C, parasitic capacitance Cs and threshold voltage $V_{th}$ of a transistor in the integrated circuit are not all the same due to the tolerance of the fabrication and the temperature such that the slope of the output voltage $V_{out}$ arises differently. Therefore, enabling the change-over switch SW with a constant frequency may cause the external capacitance $C_{ext}$ to charge overly such that the output voltage $V_{out}$ across the external capacitance $C_{ext}$ exceeds the breakdown voltage of the transistor 214 and damages the transistor 214, as the curve 3 shown. Alternatively, enabling the change-over switch SW with a constant frequency may cause the long response of restoring the sleep mode to the operating mode, as the curve 4 shown.

Figure 3B:
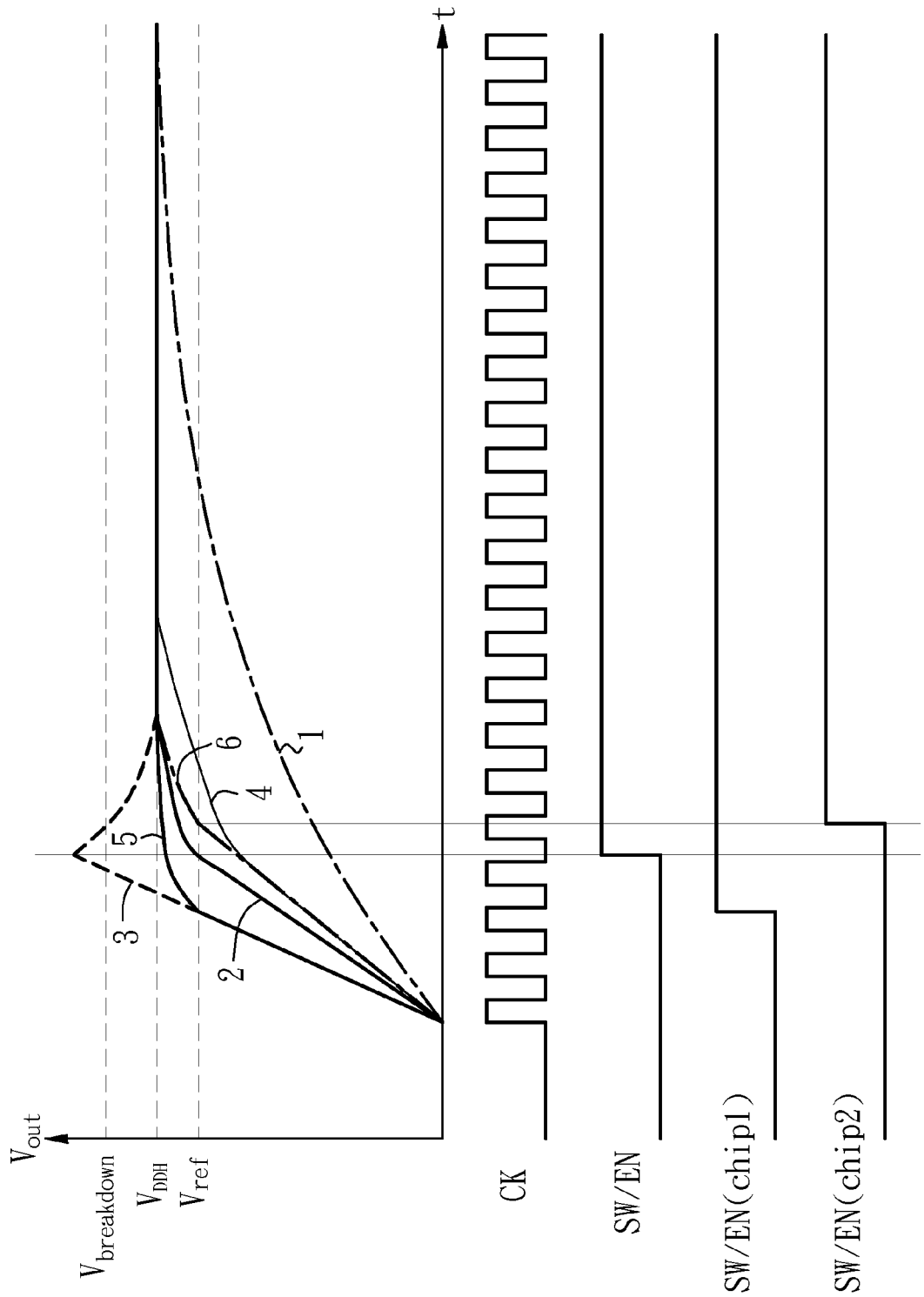
FIG. 3B shows the other operating state of the power management device of the touchable control system of the present invention.

FIG. 3B shows the other operating state of the power management device of the touchable control system of the present invention. As mentioned above, it can set an appropriate predetermined value $V_{ref}$ to improve the above issues of damaging the transistor or the long response. As the curve 5 shown, when the output voltage $V_{out}$ generated by utilizing the chip 1 reaches the predetermined value $V_{ref}$, which can be detected by the detection circuit 23. Then, by enabling the change-over switch SW, a part of the output current $I_O$ flows to the loading circuit 24 to avoid damaging the transistor. Furthermore, the curve 5 compared to the curve 1 does not cause the issue of charging slowly. Similarity, as the curve 6 shown, when the output voltage $V_{out}$ generated by utilizing the chip 2 reaches the predetermined value $V_{ref}$, which can be detected by the detection circuit 23. Then, by enabling the change-over switch SW, a part of the output current $I_O$ flows to the loading circuit 24 to avoid damaging the transistor.

In summary, it can effectively manage and control the current flowing to the loading circuit to save the power by the power management device of the touchable control system of the present invention. Furthermore, it can significantly decrease the response time of restoring the sleep mode to the operating mode by the touchable control system of the present invention such that the users can use such a mobile phone, a computer or an electronic system having a touchable screen of an electronic system more conveniently and rapidly.

Although specific embodiments have been illustrated and described, it will be appreciated by those skilled in the art that various modifications may be made without departing from the scope of the present invention, which is intended to be limited solely by the appended claims.

What is claimed is:

1. A power management device of a touchable control system, comprising:
    a boost circuit having an output terminal and generating an output voltage;
    a storage circuit electrically connecting to the output terminal of the boost circuit and stores the output voltage;
    a detection circuit electrically connecting to the storage circuit so as to detect the output voltage;
    a loading circuit electrically connecting or disconnecting to the output terminal of the boost circuit according to a predetermined value of the output voltage; and
    a change-over switch, which has two terminals being electrically connected with the loading circuit and the output terminal of the boost circuit, respectively;
    wherein before the output voltage reaches to the predetermined value, the loading circuit electrically disconnects from the output terminal of the boost circuit by the change-over switch, and after the output voltage reaches to the predetermined value, the loading circuit electrically connects to the output terminal of the boost circuit by the change-over switch.

2. The power management device of claim 1, wherein the touchable control system comprises a mobile phone, a computer or an electronic system having a touchable screen.

3. The power management device of claim 1, wherein the storage circuit comprises an external capacitor.

4. The power management device of claim 1, wherein the loading circuit comprises a driving signal generating circuit.

5. The power management device of claim 1, wherein the detection circuit comprises a comparator.

6. The power management device of claim 1, wherein the boost circuit comprises a charge pump.

7. The power management device of claim 6, wherein the charge pump comprises a Dickson charge pump.

8. The power management device of claim 1, wherein the predetermined value comprises a reference voltage of the touchable control system.

9. The power management device of claim 1, wherein the predetermined value generates according to a predetermined clock of the touchable control system.

10. The power management device of claim 1, wherein the boost circuit comprises a plurality of transistors and one of which electrically connects to the storage circuit.

11. The power management device of claim 10, wherein the predetermined value is between a break voltage of the transistor electrically disconnecting to the storage circuit and an operating voltage of the touchable control system.

* * * * *